United States Patent
Dilger et al.

(10) Patent No.: US 6,290,571 B1
(45) Date of Patent: Sep. 18, 2001

(54) VIRTUAL TEACH-IN SYSTEM

(75) Inventors: Christian Dilger, Leinfelden-Echterdingen; Frieder Huben, Moessingen, both of (DE)

(73) Assignee: Walter AG, Tuebingen (DE)

( * ) Notice: Subject to any disclaimer, the term of this patent is extended or adjusted under 35 U.S.C. 154(b) by 0 days.

(21) Appl. No.: 09/478,186

(22) Filed: Jan. 5, 2000

(30) Foreign Application Priority Data

Jan. 5, 1999 (DE) .............................................. 199 00 117

(51) Int. Cl.[7] .............................. B24B 17/10; B24B 49/16
(52) U.S. Cl. ...................................... 451/5; 451/8; 451/10
(58) Field of Search ............................... 451/5, 8, 10, 49, 451/57, 160, 425, 426, 548

(56) References Cited

U.S. PATENT DOCUMENTS

| | | |
|---|---|---|
| 5,046,022 | 9/1991 | Conway et al. . |
| 5,051,912 | 9/1991 | Johanson et al. . |
| 5,569,060 * | 10/1996 | Mori et al. ................................ 451/5 |
| 5,595,525 * | 1/1997 | Hayashi et al. ........................... 451/5 |
| 5,844,805 * | 12/1998 | Uchimura et al. .................... 451/5 X |
| 5,862,056 | 1/1999 | Iwata et al. . |

FOREIGN PATENT DOCUMENTS

| | | |
|---|---|---|
| 196 25 542 | 1/1988 | (DE) . |
| 42 28 702 | 3/1993 | (DE) . |
| 44 15 659 | 5/1994 | (DE) . |
| 195 06 204 | 9/1996 | (DE) . |
| 197 39 559 | 3/1999 | (DE) . |
| 0 513 369 | 11/1992 | (EP) . |
| 0 530 364 | 3/1993 | (EP) . |
| 0 642 067 | 3/1995 | (EP) . |
| 2043300 A * | 10/1980 | (GB) ........................................ 451/5 |
| 2 140 937 | 12/1984 | (GB) . |
| 59-76761 A * | 5/1984 | (JP) ........................................ 451/5 |
| WO 98/38552 | 9/1998 | (WO) . |

OTHER PUBLICATIONS

"Einfach und Werkstattnah Programmieren", Technische Rundschau, vol. 37, 1993, pp. 70–71.
"Neue Systeme für werkstattiorientierte Programmierverfahren", wt Werkstattstechnik, 78 (1988), pp. 193–198.
"Einsatz objektorientierter Strukturen zur Programmierung von NC–Mehrschlittendrehmaschinen", wt–Produktion und Management, 84 (1994), pp. 26–30.

* cited by examiner

Primary Examiner—Joseph J. Hail, III
Assistant Examiner—Anthony Ojini
(74) Attorney, Agent, or Firm—Frishauf, Holtz, Goodman, Langer & Chick, P.C.

(57) ABSTRACT

A virtual teach-in module for programming grinding machines or other kinds of machine tools includes a graphic user surface. This surface includes the visual display of blanks, workpieces and tools. The elements shown can be displaced arbitrarily relative to one another by means of suitable operator elements. The resultant displacements are recorded by the virtual teach-in module and converted into a machine control program, or an existing machine control program is varied based on the displacements.

30 Claims, 14 Drawing Sheets

MACHINE CONTROL PROGRAM

LIST OF DATA RECORDS

→ PROGRAM CONTROL

| X | Y | Z | $S_1$ | $S_2$ | $S_3$ |
|---|---|---|---|---|---|
| 10.0 | 0 | 0 | 0 | 0 | 0 |
| 10.0 | 2 | −3 | 0 | 0 | 0 |
| 10.0 | 2 | −3 | 0 | 1 | 0 |
| 10.0 | 2 | 20.3 | 0 | 1 | 0 |
|  |  |  |  |  |  |
|  |  |  |  |  |  |
|  |  |  |  |  |  |

FIG.16C

VIRTUAL TEACH-IN SYSTEM

FIELD OF THE INVENTION

The invention relates in general to a system for generating, varying and/or displaying programs for machine control. In particular, the invention relates to a system for generating, varying and/or displaying programs for controlling grinding machines.

BACKGROUND OF THE INVENTION

Machine tools are as a rule program-controlled in that machining operations which are to be performed on a workpiece proceed under program control. To generate a relative motion between the tool and the workpiece, a plurality of NC (numerically controlled actuators) axes are provided. For example, a grinding head is supported on a suitable linear guide, which in turn is provided with an NC drive mechanism, or machine controlled actuator. Actuating one or more such acuators creates a positioning motion. In grinding spiral grooves on drilling tools, for instance, a plurality of motion components must be superimposed in order to achieve a suitable relative motion between the workpiece and the tool.

Numerically controlled machine tools, and control programs for them, are known. European Patent Disclosure EP 0 530 364 A1, for example, discloses an interactive numerical control that produces a display of a workpiece on a monitor on the basis of existing NC data. An interactive variation of the NC data can be displayed directly. Effects of data changes are thus made immediately visible. The system includes storage means, calculation means, display means and input means. From the display of the machining process on a monitor, the NC data can be corrected directly on the screen.

Programming NC machines demands certain skills, both in the programming language used and in terms of the special conditions involved in machining certain surfaces of the workpiece.

SUMMARY OF THE INVENTION

It is an object of the invention to make it easier to operate NC machines.

This and other objects of the invention are attained by a system that has a teach-in module, which can be embodied by a computer program running on suitable hardware, for instance. The teach-in module allows a visual, preferably three-dimensional display of a workpiece and a working tool. This is possible even if a machine control program of any kind is not yet available. Presume, for example, that it is desired to form a machined tool from a workpiece. A blank, or an incompletely machined tool, is then displayed as the workpiece. The blank or the partially machined tool can be electronically stored in a memory and then retrieved from the memory, for example. Alternatively, the teach-in module may be provided with the capability of putting together blanks or starting bodies for producing machined tools from simple geometric shapes, such as cylinders, parallelepipeds, cubes, or the like. The teach-in module can be provided with suitable scaling functions, so that the working tools, blanks or basic bodies can be displayed visually in a desired size and with a required dimensional ratio.

The teach-in module is arranged to display an operator-specified motion of the workpiece and the working tool relative to one another in response to suitable manual inputs. The motions can be input as single motion steps, for instance, or as motions that follow a predetermined path. Specifying a path can be done for instance using typical paths, such as straight lines, helical lines, or similar courses, that are stored in a memory. Once again, a scaling function may be provided. It is also considered expedient to enable either incremental positioning or input of a motion path. Smoothing functions can be introduced via a manually input path.

One component of the teach-in module is that a machine control program is generated or modified on the basis of the relative motion which is input into the teach-in module, between a display of the working tool and a display of the workpiece. While the teach-in module is displaying the machining progress resulting from the relative motion between the workpiece and the working tool, or in other words is displaying the recesses generated virtually on the blank, for instance by means of a grinding wheel, the machine control data that correspond to such a machining operation are generated at the same time. In this way, the machine control program can be generated by virtual teaching-in. If the machine control program already exists, then it can be modified by the virtual teach-in method. This simplifies the operation of a corresponding numerically controlled machine tool considerably. It makes it possible in a simple manner to manipulate machine control programs, which describe not only the motion sequence but also the speeds of the actuators of a grinding machine as well as status changes at the inputs of a control unit. Such a control unit can be a memory programmable control (referred to herein as "SPS"). This type of control does not use a microprocessor but, rather, a memory such as a PROM which supplies a programmable output for each input signal. As a rule, such machine control programs comprise not only individual commands regarding single motions of the machine actuators but also SPS control commands. Program lines and program blocks made up of a plurality of program lines control the motion of one or more actuators between two points in space. The virtual teach-in module now makes it possible for instance to vary existing program lines, or existing blocks composed of a plurality of program lines, to add new program lines or blocks, and to delete existing program lines or blocks.

To that end, the virtual teach-in module preferably has a storage means, which is arranged for storing in a memory tool data and operating instructions about the relative motions between the working tool and workpiece. To that end, a memory present in hardware form, for instance, is put under the control of a suitable program or program section, which is executed on a suitable computer. The computer also includes a calculation means, to which a corresponding program section and the hardware that runs that program or program section belong. The calculation means processes the work instructions that are present in and furnished by the storage means, so as to change or add to the workpiece data and/or working tool data in accordance with the work instructions, as appropriate for machining of the workpiece by the working tool in accordance with the relative motion defined by the work instructions. In this way, a material erosion, for instance, and/or optionally tool wear as well, can be modeled. This is displayed by the display means, which includes a display device and the corresponding program, which serves to make data graphically visible on the display device. An input means serves to detect desired relative motions between working tool and workpiece, which are converted into corresponding work instructions, which in turn are stored or buffer-stored in memory by the storage means. The input means can include input devices and a playback device, on which virtual input keys or the like can be shown.

In an advantageous embodiment, a transformation means is also present which converts the work instructions generated as above into a machine control program. Alternatively, the work instructions can correspond directly to a machine control program, in which case transformation can be dispensed with.

In the manipulation of the display provided by the virtual teach-in module, the machine control program is generated and/or varied. This can include both the above-described qualitative actions and changes in the machine control program and also changes in the data that are assigned to individual parts of the program.

The input means, which can be formed for instance by a special input device, or an input device in conjunction with input panels shown on a screen, can include both operator panels associated with individual machine axes, actuators and operator panels for configurable axes that do not match the machine axes and actuators. This makes operation even simpler.

The teach-in module can be contained in a simulation module, or vice versa. Also, these modules can be individual modules coupled to each other. This arrangement allows the machining that has been input to be shown in the manner of a motion-picture film. In an advantageous embodiment, the simulation can also be performed either incrementally or in slow motion or in time-lapse form, as needed. The simulation can be interrupted and can be corrected by the teach-in module, if that should be necessary.

It can also be advantageous to provide a means with which the resultant workpiece dimensions can be determined from the visual display. Such means can be a cursor, for instance, with which points of the workpiece can be selected or addressed arbitrarily, in which case this means determines dimensional relationships between the points.

The view shown by the display means is preferably a three-dimensional display, which provides the viewer with a three-dimensional impression of the virtually-created workpiece. The system of the invention can either be operated on a separate computer or be integrated with the controller of an NC machine, for instance. In the first instance, NC programs for NC machines can be set up interactively, after which the program thus set up is transferred to the otherwise conventional NC machine. Data storage media or data lines can be used for this purpose.

BRIEF DESCRIPTION OF THE DRAWINGS

FIG. 16B shows an example of a machine control program.

FIG. 16C is a chart that shows a list of data records.

DETAILED DESCRIPTION OF THE PREFERRED EMBODIMENT

Figure 1:
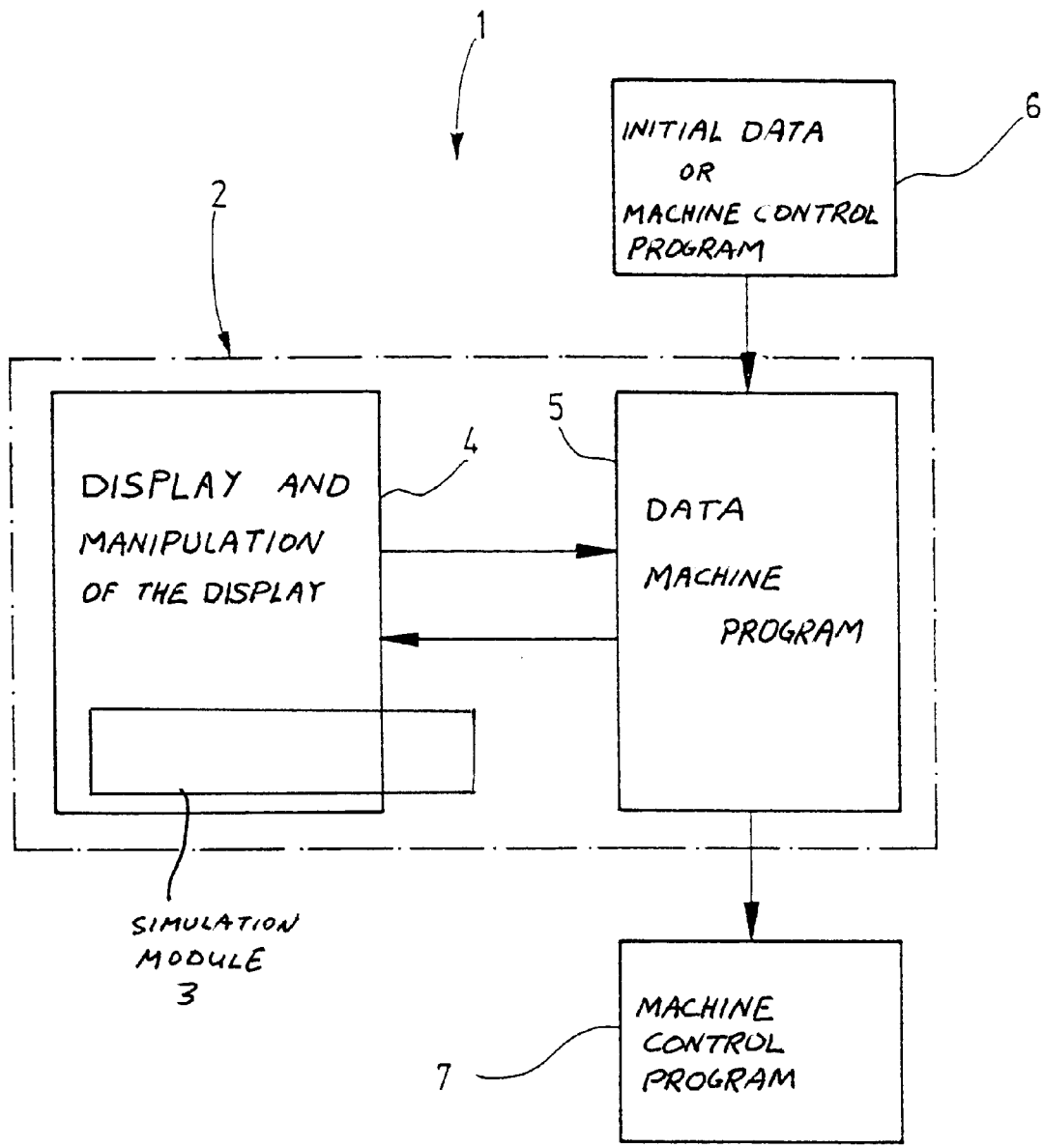
FIG. 1 shows a general block diagram of a system for generating, varying and/or displaying machine control programs.

FIG. 1 shows a teach-in system 1, which serves to generate, vary and display programs for machine control. The system 1 has a teach-in module 2, which is used to set up machine control programs interactively. The teach-in module 2 includes a computer program and the underlying hardware. It has a program part 4, which is arranged to act on data, schematically characterized by a block 5 in FIG. 1, and on a machine control program. The teach-in module has a collision observation module 2a, seen in FIG. 3, and a time calculation module 2b. The collision observation module 2a serves to detect undesired collisions between working tool and workpiece, that is, collisions that do not constitute contact in the sense of workpiece machining (metal-cutting). The time calculation module 2b serves to determine the machining time that will result when the machine control program is actually executed. Teach-in module 2 also includes a simulation module 3 which processes data to perform a simulation run that can be shown on the display, as explained below.

The data can be delivered to the teach-in module 2 from a block 6, which can for example contain data that form a picture of an unmachined workpiece. Once the initial data have been transferred from block 6 to block 5, they are applied by the teach-in module 2 for display and manipulation of the display. On the basis of the manipulation of the display, action is exerted in turn on the data in block 5 and the machine program in program part 4 again, until the desired data set and machine program have been generated. This is then output as a machine control program, as represented in FIG. 1 by a block 7.

Figure 2:
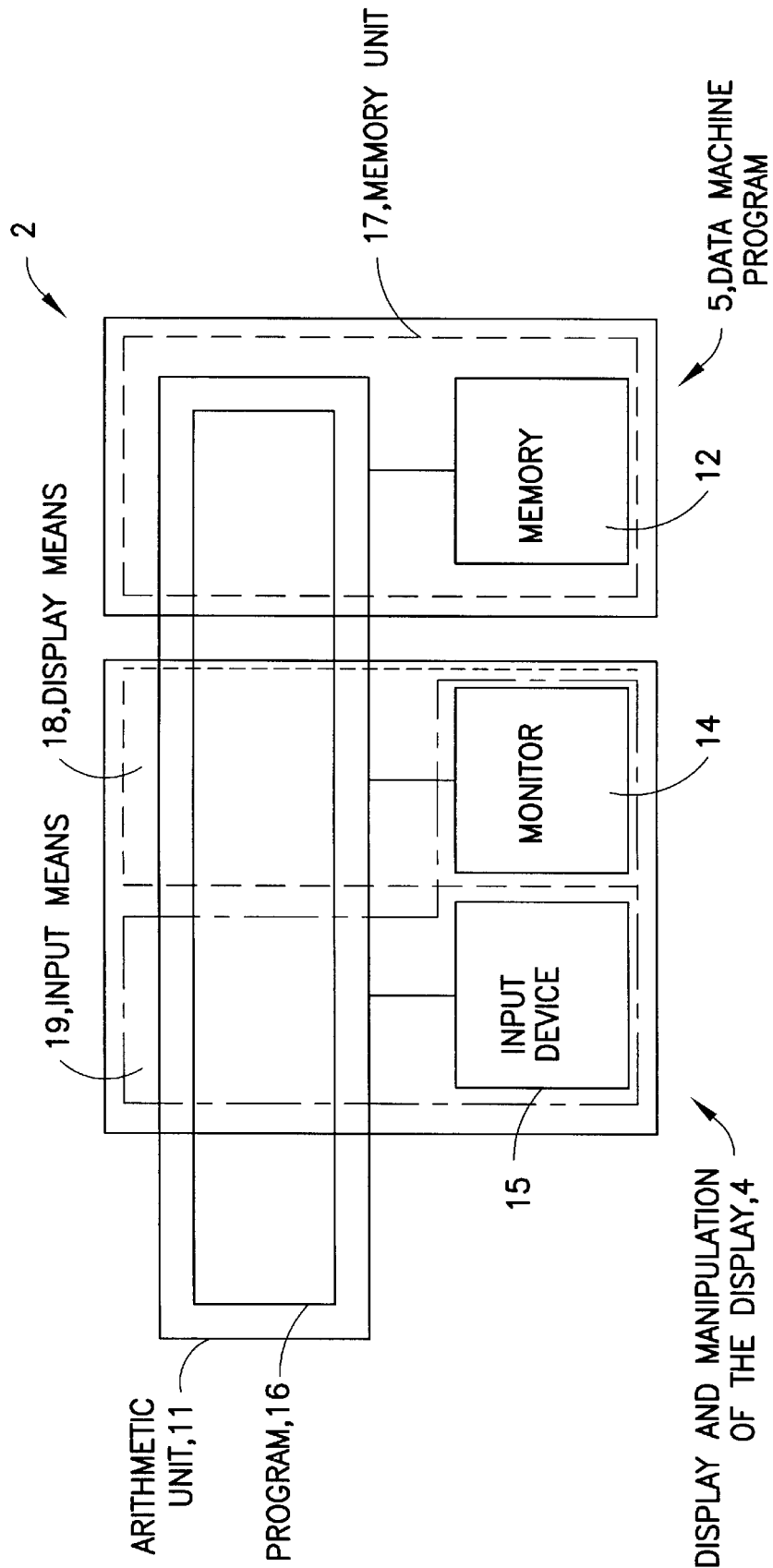
FIG. 2 shows a general block diagram of the teach-in module of FIG. 1.

As shown in FIG. 2, the teach-in module 2 includes not only a computer with a control and processing unit, which forms an arithmetic unit 11, but also a memory 12, a monitor 14, and an input device 15. The simulation module 3 is not shown in FIG. 2 to avoid unnecessarily complicating the depicted representation. The memory 12, with a section of a program 16 (also referred to herein as a processing module) running on the arithmetic unit 11, forms a memory unit 17 for storing workpiece data, tool data, and instructions that characterize a relative motion between the tool and workpiece. A further section of the program 16, together with the monitor 14, forms a display means 18 for displaying the workpiece, the tool, and the motion of workpiece and tool relative to one another. Operating the teach-in system is done via a further section of the program 16 in combination with the input device 15 and the monitor 14. The applicable program section, together with the input device 15 and the monitor 14, forms an input means 19. The teach-in system 1 described thus far functions as follows.

As an example, it will be assumed for now that there is not yet any machine control program. Data transferred from block 6 to the teach-in module 2 therefore describe a workpiece in the unmachined state, plus at least one selected working tool. This working tool is shown on the monitor 14, together with the workpiece from block 4, by the display means 18. With the input device, motions in the displayed workpiece and/or the working tool are now specified. SPS control commands can be input or specified as well. These include turning coolant valves on and off, for instance. Moving the displayed elements and inputting of the SPS control commands can be done from a keyboard, but is preferably done by inputs using a joystick or mouse, in conjunction with an input menu or other displays shown on the monitor 14. The motions that result are recorded as data and converted into control instructions for an NC machine. In this way, a machine control program is created in block 5, step by step. Once the workpiece and tool have run through all the desired positions, the teach-in operation is ended, and in block 7 the finished machine control program, defined in a sense by the track of the relative motion of the workpiece display and working tool display, is output. The machine control program can now be transferred directly to a machine tool, which then executes it.

Figure 4:
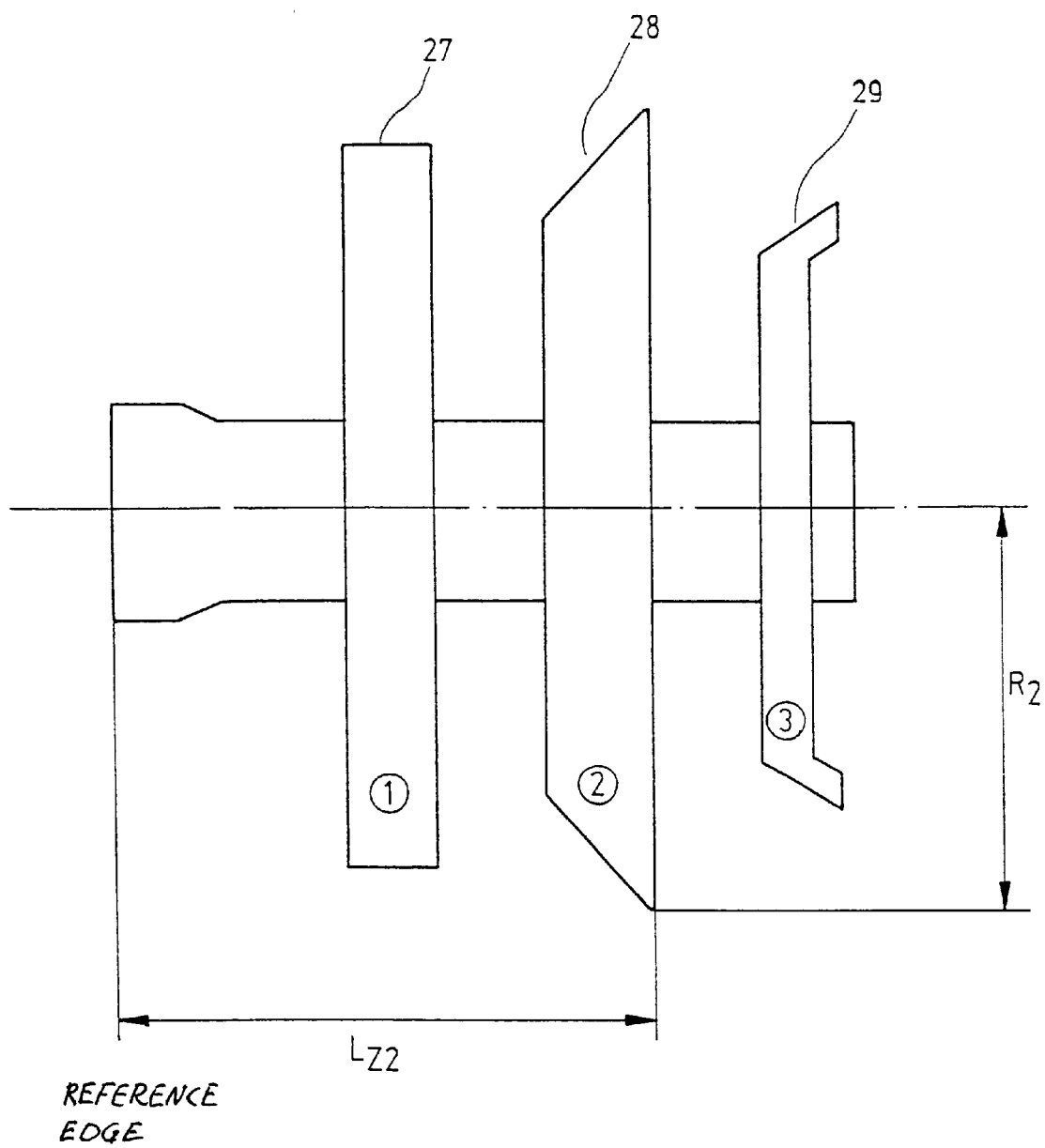
FIG. 4 shows an element of the working tool set in a schematic illustration.

Depending on the machine kinematics (axis and actuator arrangement) of the machine tool on which the program is to be executed, and depending on the machine geometry, corresponding data can be defined in a configuration menu. Other configuration data, such as the description of the geometry and disposition of the tools (grinding wheels) and the geometry of the workpiece, as well as the chucking means, can be specified from an external source, via interfaces. For example, these can be written-in using data storage media. The data to be written-in, which make up an input data set, can include the following:

a) Tool data: description of the geometry of the working tools, and especially of grinding machines used as working tools, and their position on being installed in the machine. In particular, individual wheels can be combined into sets of wheels, of the kind shown in FIG. 4. These data can be stored in datasets, or files, that are either on hand or can be furnished as needed. The data can also be stored in a data base that is part of the teach-in system or is used as needed.

b) Data on the chucking means: description of the geometry of the chucking means of the workpiece. These data can again be stored in datasets or files, or in a data base.

c) Workpiece data: description of the geometry of the workpiece as an unfinished part. These data will have already been stored in datasets or files, or in a data base. Alternatively or in addition, unfinished part geometries can be derived from simple geometric shapes.

d) Machine control program data (if available): description of the NC program used. This program is either in the form of a dataset or file, or can be transferred to the teach-in system via data storage media or over a line.

e) Machine data: description of the geometry, axis and actuator configuration of the machine used.

The data that are output include:

a) Modified machine control program data: The modified or re-created machine control program is output in the form of a dataset or file. If the teach-in system is part of a machine tool, it is transferred directly to the machine controller. If the teach-in system is part of a computer located at a distance from a machine tool, then it can be transferred to the machine controller over a line or via a data storage medium.

b) Screen: The execution and modification of the machine control program are shown graphically by material erosion on the screen. If an undesired collision occurs inside the machine, a warning can be issued and the program can be discontinued on the spot. If needed, the program line in which the collision occurred can be written into a log file.

c) Generated workpiece model: The workpiece model that has been generated can be transferred to a CAD system or some other system for further processing.

The input and transformation programs described above are preferably implemented with the widely used C++ program using well known programming techniques. The program receives input data generated by operation of the "soft-keys" of the panel shown in FIG. 6, as described below. The present state of the machine is represented by a data set within the memory 12. The data set includes the present position of all NC axes/actuators, the advancements, the PLC state (for example the valves for cooling fluids or the speeds of tool shafts). The program changes this state according to operation of the soft-keys, i.e. the data set is modified according to key operation.

The transformation of relative motion into machine control data is done by firstly moving the graphical representations of the workpiece and the tool according to the input. This is a well known program technique known, for example, from Windows™ where one can click with the pointer on an object and move it along a chosen path. Thus, the data defining the screen picture will change. The teach-in-module transforms this data into the special data form which is considered to be a machine control program. The transformation program, again, is preferably a C++ program. Once the function is defined, the implementation of a transformation program is readily apparent to anyone with ordinary skill in the art.

Figure 3:
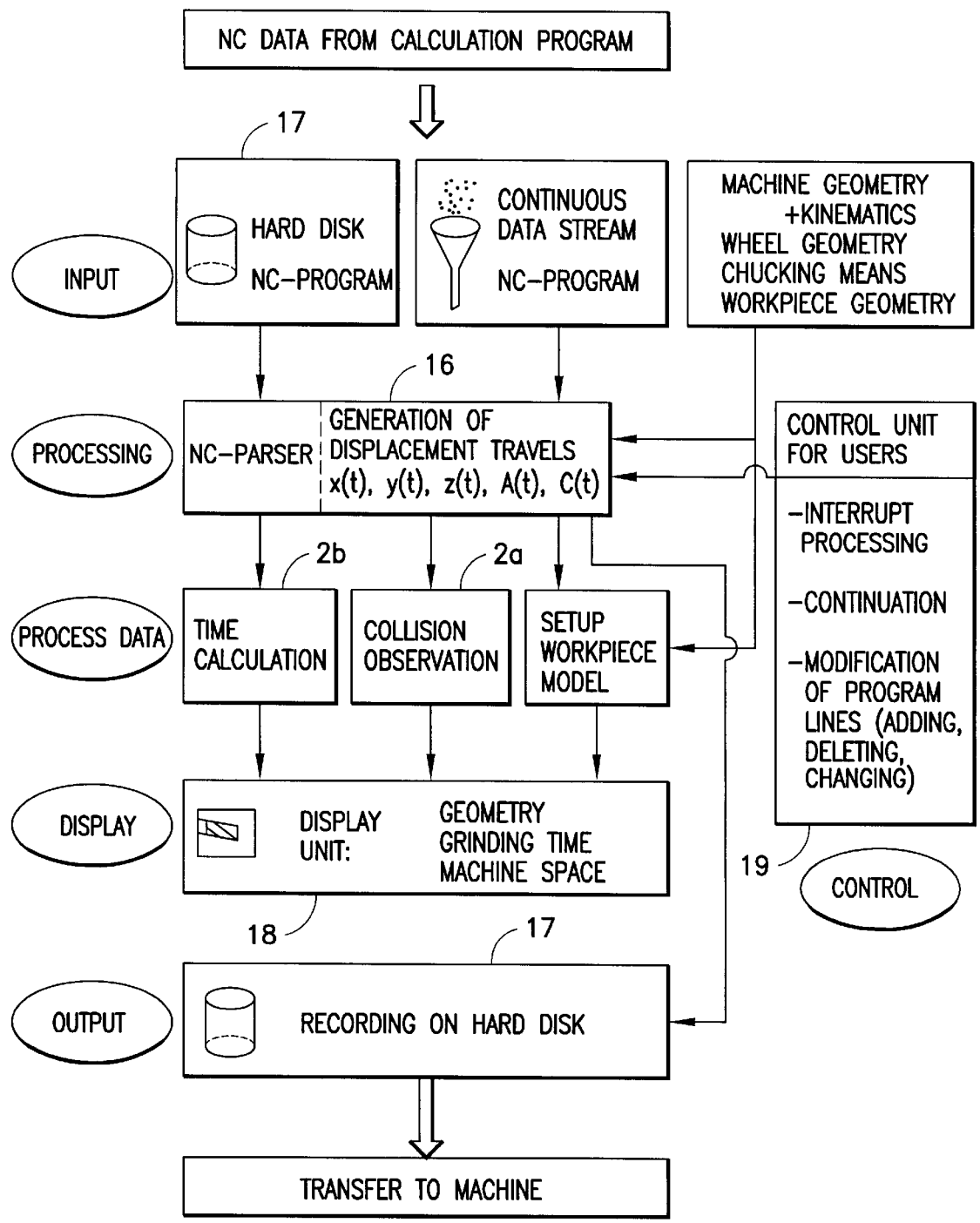
FIG. 3 shows the data flow of the teach-in module depicted in the form of a block circuit diagram.

To further illustrate the operation of the virtual teach-in system, FIG. 3 schematically shows portions of the data flow of the system pertinent to the invention. The communication of the virtual teach-in system with other system components, and starting the system operation, are done by a higher-order program that is not described herein nor shown in the drawings since details thereof are well known and not deemed necessary here. This also includes transferring the generated machine control program to the machine.

From an existing machine control program stored in a hard disk memory or obtained from a machine control program arriving as a continuous data stream, displacement paths of machine actuators are generated in a processing module 16. In FIG. 3, this is shown for five different axes X, Y, Z, A and C. The processing module also receives data about the machine geometry and kinematics, the wheel geometry, the chucking means, and the workpiece geometry. It is also connected to the input means 19 with which the user can perform an operation, interrupt or continue the processing, and add, delete or modify program lines or blocks in a targeted way as needed. From these data, the processing module sets up a workpiece model, carries out a collision observation, and calculates the machining time required. This calculation, along with the collision observation and the workpiece model, are displayed by the display means 18. The displacement paths generated by processing module 16 are transferred to the memory unit 17 and thus recorded on the hard disk. They can be transferred to the machine in the form of a machine control program or the displacement paths can be transferred to a machine control program.

The processing module is described in greater detail as follows.

Creation of Displacement Paths for Machine Control Actuators:

The received machine control program will be transformed into a list of data sets each characterizing a state of all actuators. This transformation is "inverse" or opposite to the generation of the machine control program from the data sets characterizing each state. For transforming the machine control instructions which are defined by the machine control program into the data sets a list or schedule (table) is used. This list or table is suitable for performing the transformation in both directions i.e. from the machine control data to the data sets, and vice versa.

In general, the data sets defining a present state are obtained for example when reading an existing machine control program or by manipulating the graphical representations of the machine tool elements. Regardless of whether the process-starts with an existing machine control program or with graphical inputs, the working process is internally represented by the state data set. A modification of the state data set may be performed by amending the machine control program or by manipulating the graphical representation. The table or list mentioned above will transform any amendment of the state data set into amendments of the graphical representation and of the machine control program. Thus, the state data set is a link between the graphical representation and the machine control program.

The movement of a machine element (for example the working tool or an actuator) is performed by following the instructions of the state data set. The movement of the actuator will be obtained by comparing two sequential states. The difference is the movement. The same is true for the PLC. A change of the state will immediately lead to an action of the PLC (for example the actuation of a valve).

Figure 16A:
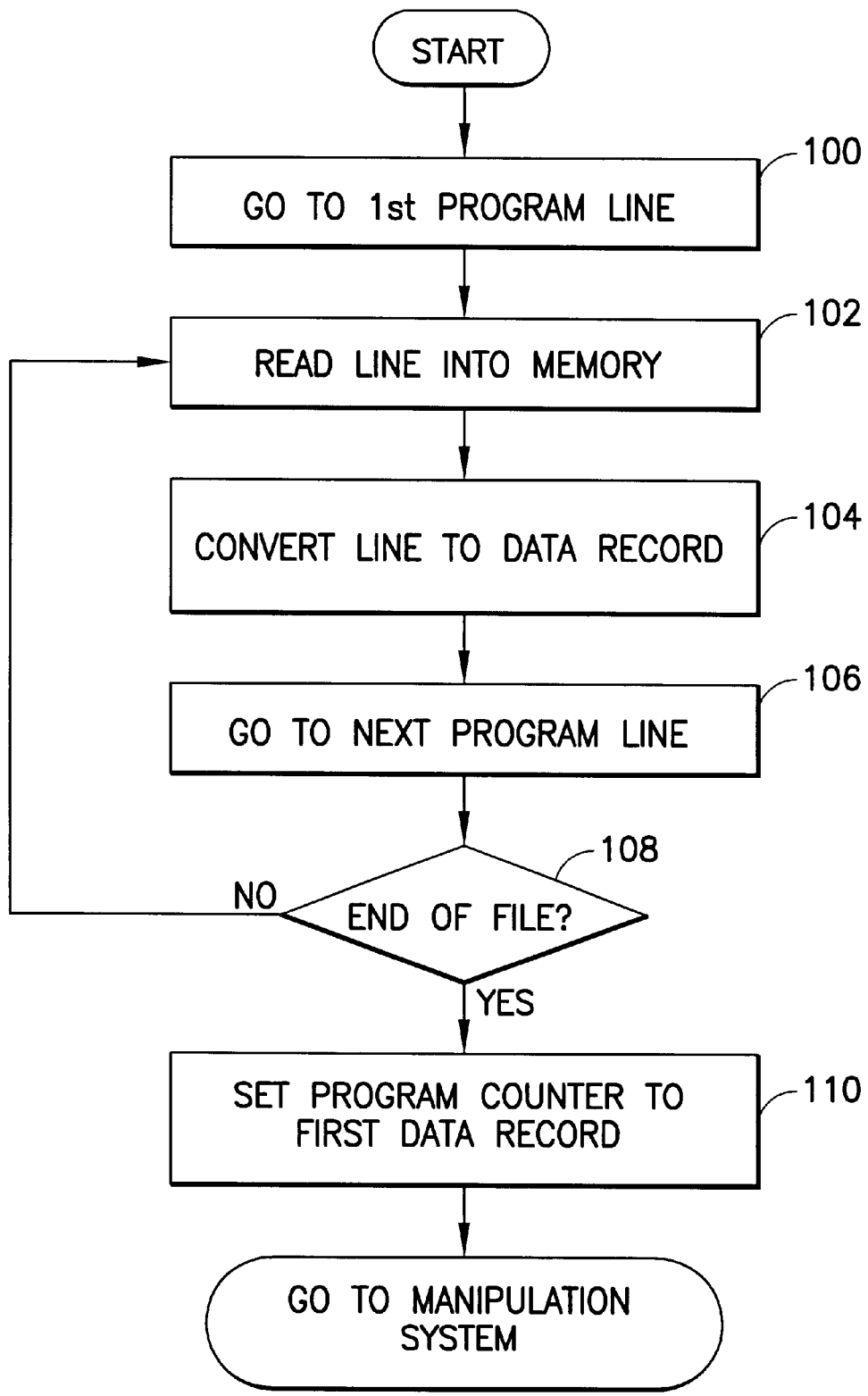
FIG. 16A is a flow chart illustrating conversion of a machine control program to state data sets.

FIG. 16A is a flowchart that illustrates the conversion of a machine control program to state data sets. The first line of the machine control program is accessed, per step 100, and it is read into memory, per step 102. Step 104 converts this line into a data record, and then the flow proceeds to the next program line, per step 106. The sequence of steps 102, 104 and 106 is repeated until step 108 determines that the end of the file has been reached, in which case step 110 sets the program counter to the first data record. The flow then proceeds to the manipulation system depicted in FIG. 17, as described below.

FIG. 16B shows an example of a machine control program, and FIG. 16C shows a chart of data records.

Processing of the geometry and kinematics of the machine and of the working tools:

The processing of the data of the machine geometry or kinematics is performed just as for a conventional CAD system.

Processing of the Operation Inputs:

The processing of the input data is performed as explained above in connection with the input means and FIG. 6. The operator inputs are used to modify one or more state data sets.

Generation of a Workpiece Model:

The generation of a workpiece model is accomplished as follows. The movement of the tool defines a space or volume. The envelope is represented by data. These date will be compared ("intersected") with data representing the envelope of the workpiece. All data which define spaces or volumes in which the envelope intersects the workpiece will be subtracted (cut away) from the workpiece model. This will lead to a new workpiece model which represents the processed workpiece. All movements of the tool will be modeled by the same principle and the workpiece model will be updated. This process will be repeated as long as all tool movements are performed. This will lead to a model of the processed workpiece. Algorithms and methods for intersecting an envelope with a workpiece model are to be taken from the basic literature in this field.

Performing Observation of a Collision:

The observation of collisions is performed as explained in connection with generation of a workpiece model. The only difference is that instead of the envelope of the working tool the envelope of other machine parts is used.

Calculation of the Processing Time:

Calculation of the processing time is done by sequentially performing all instructions defined by the state date sets. The distances passed by the machine controlled actuators and the speeds are known so that the time required for the movement can be calculated. The sum of all calculated times is the processing time. Some known times for example for performing a CLC instruction can be taken from a schedule.

Figure 5:
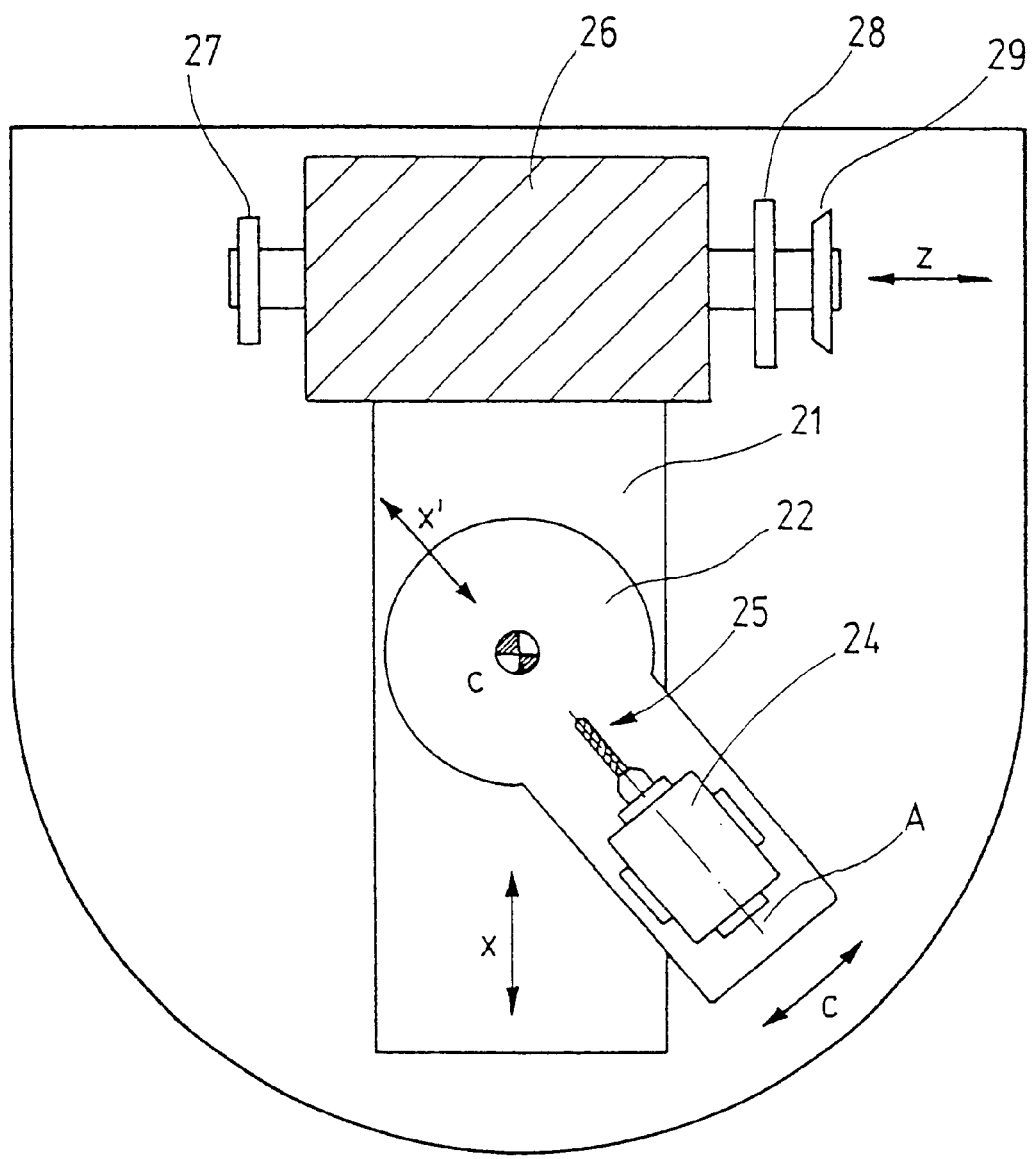
FIG. 5 shows a grinding machine and both a real and a configurable axis in a schematic plan view.

A plan view of the machine is schematically shown in FIG. 5. It has a machine bed 21, on which a workpiece carrier 22 is supported so as to be pivotable about a vertical axis C. The workpiece carrier 22 is also adjustable in a horizontal direction by means of a further NC axis X. It also carries a receiving device 24 for a workpiece 25, such as a drilling tool. A rotary positioning device, which represents a further NC axis A, can be provided on the receiving device 24 as needed.

In the vicinity of the workpiece carrier 22, a grinding head 26, which carries one or more grinding wheels 27, 28, 29, is also provided. As needed, the grinding head 26 is adjustable in a direction that coincides with the pivot axis of the grinding spindle by means of an NC axis Z and linearly in a direction parallel to the C axis (NC axis Y). The workpiece 25 is not linearly adjustable relative to the workpiece carrier 22. An axial motion (from the standpoint of the grinding wheels 27, 28, 29) of the workpiece 25 in the direction X' can be accomplished by superimposing motions in the Z direction (motion of the grinding head) and in the X direction (motion of the workpiece carrier).

Figure 6:
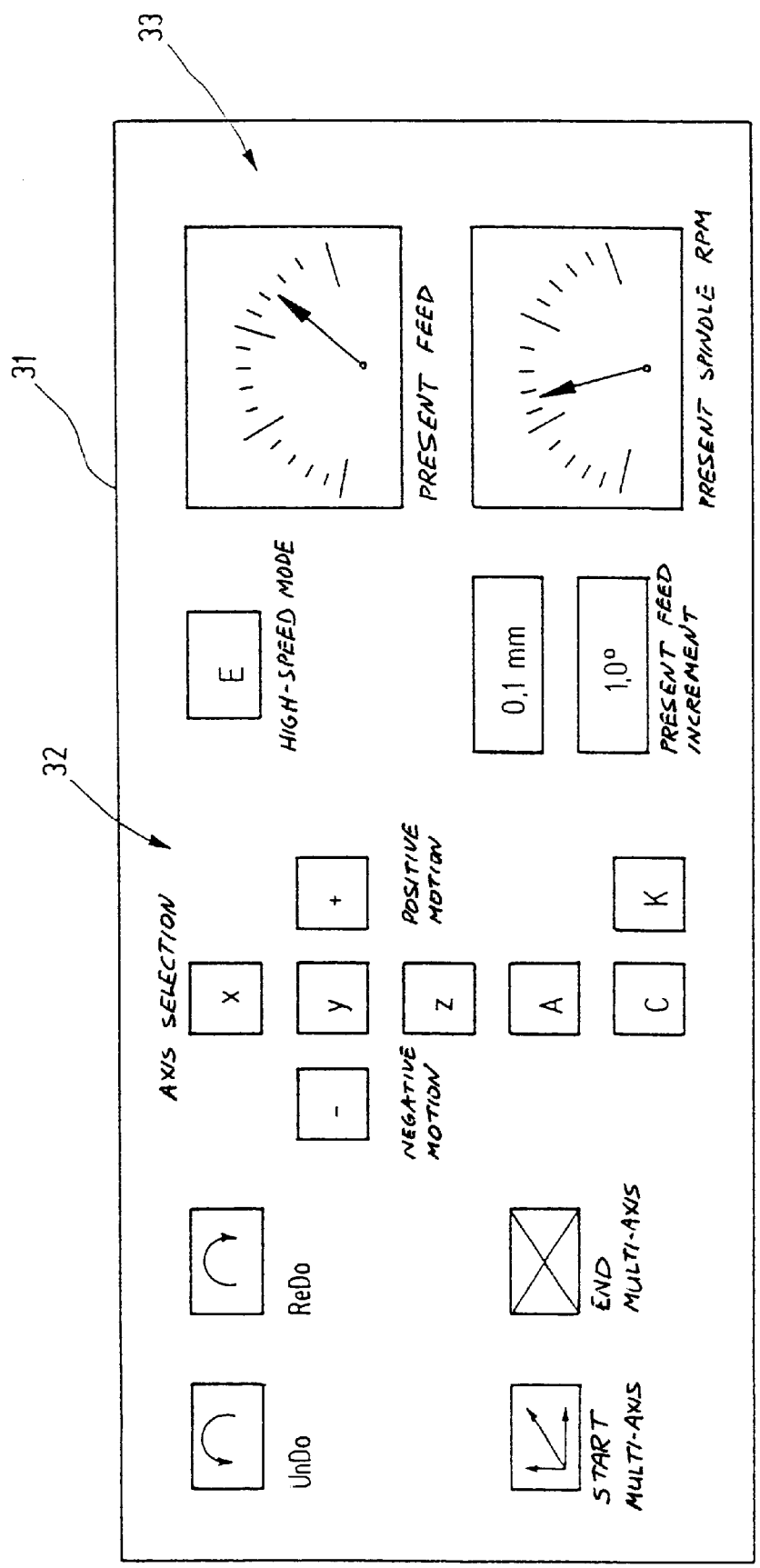
FIG. 6 shows an operator panel for inputting desired relative motions between the virtual working tool and the virtual workpiece.
Figure 7:
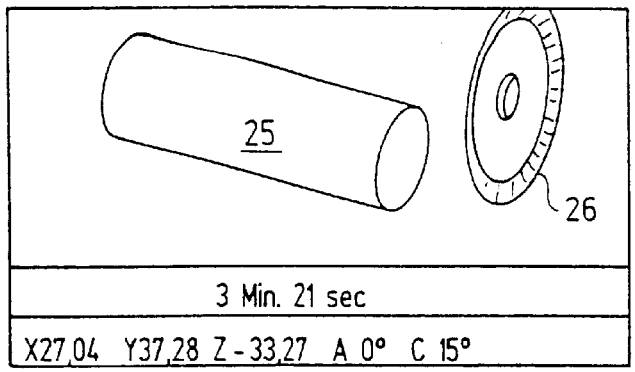
FIGS. 7–9 are each a screen display of the virtual working tool and the virtual workpiece when the motion is being input.
Figure 8:
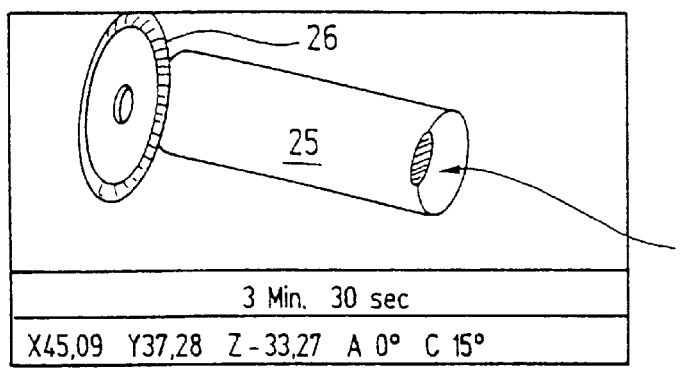
Figure 9:
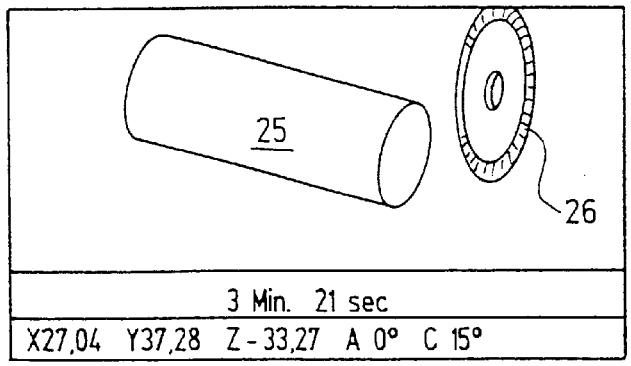
Figure 10:
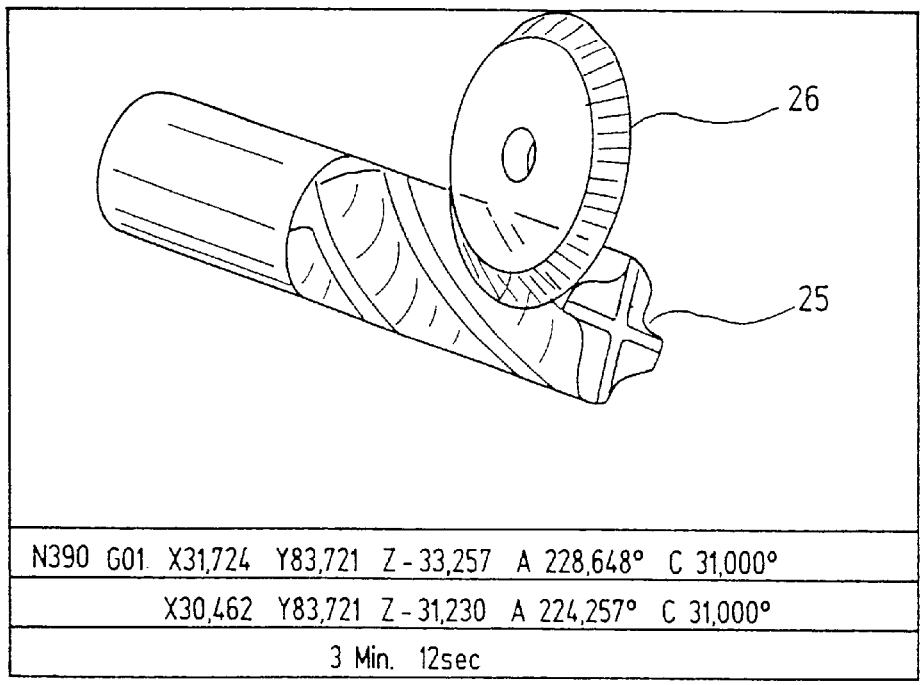
FIG. 10 is a screen display of the working tool and workpiece when desired machining operations are being input.

For the interactive teach-in programming of this NC machine, the virtual teach-in module whose operator panel is shown in FIG. 6 is used. The illustration shows an operator panel 31 for display by the display means 18 on a monitor 14. The operator panel 31 includes a plurality of operator keys 32 and display areas 33. Such operator keys are well known and can be touchscreen keys or buttons that can be "pressed", or clicked, with a cursor controlled by a mouse or the like. The operator keys include keys X, Y, Z, A, C for selecting NC axes of the grinding machine. The keys marked "−", "+" and "E" (for high-speed mode) serve to control the motion. The present feed increment can be adjusted in linear or angular increments. A repeat key ReDo restores the last step to have been deleted. Another operator key panel UnDo deletes the last step to have been input. For further selection of the axes and actuators, an operator key panel K is also provided, which identifies a configurable axis. This axis may deviate from the NC axes that are actually present and can be assembled by superposition of the motion of the various actually present machine axes X, Y, Z, A, and C.

All the motions are conceived of and executed as linear between two points in space. Changes in angular coordinates are represented by linear angle changes. The motions of the drive mechanism can be executed as either a motion of one actuator defining an axis or the simultaneous motion of a plurality of controlled actuators. In the single motion, one axis and actuator are selected and the actuator moves in accordance with the feed rate selected and with the number of repetitions of the incremental motions along the associated distance. The simultaneous motion of a plurality of actuators can be described as the succession of single actuator motions. The "multi-axis/actuator motion" mode is turned on, and the actuators are moved in succession to the desired terminal point. The "multi-axis/actuator motion" mode is then turned off again and all the (linear) motions since the "multi-axis/actuator motion" was turned on are combined into a simultaneous motion of all the axes and actuators involved.

Instead of combining single motions of machine controlled axes and actuators into a superimposed axis/actuator motion, in some case the "configurable axis" can also be used. It is put together from the machine actuators. The configurable axis does not exist as a real axis and actuator, however. The motion along this axis must be generated by the simultaneous motion of one or more machine actuators. In most cases, it is expedient to place a configurable axis in the center axis of the workpiece. Moving the working tool (grinding wheel) parallel to the workpiece axis is thus possible. A motion of the grinding wheel along this axis is thus always parallel to the longitudinal axis of the workpiece and need no longer be programmed as a combined motion of two machine actuators of two axes, as can be seen from FIG. 5. The configurable axis is operated like a machine axis. In the machine control program (NC program), however, this motion is composed of the machine axes and actuators that are present.

The definition of the configurable axes is provided by a configuration dataset, or file. This configuration dataset or file can be modified via a menu. Thus the configurable axes can easily be adapted to different machine configurations or to the needs of special working tools or workpieces as well. In the process, the orientation of the particular configurable axis in space and the way in which it is coupled to the machine axes are defined.

In the movement of the wheel set and workpiece through the machine space, collisions can occur. These collisions can be classified in the following categories:

(1) collisions of the grinding wheel with the workpiece in the high-speed mode;

(2) collision of the grinding wheel with the workpiece carrier or chucking means and other machine parts;

(3) collision of the workpiece with machine parts or with parts of the grinding wheel that do not perform metal-cutting machining; and (4) collision of the workpiece with a grinding wheel that is not the actual wheel that performs metal-cutting machining.

Such collisions are of importance particularly whenever existing NC programs are being analyzed. The collision observation can be added during the execution of the NC program, either in single-step processing or in continuous processing. However, it is not an absolute necessity that it be turned on, and thus it represents an optimal property of the system.

For the collision observation, two different operating modes are possible:

a) On-line mode: The graphics are shown in the collision observation, and the material erosion is updated. If a collision occurs, the program processing stops, and a warning is issued.

b) Off-line mode: The collision observation is performed without graphics, and collisions are output to a log file.

Figure 11:
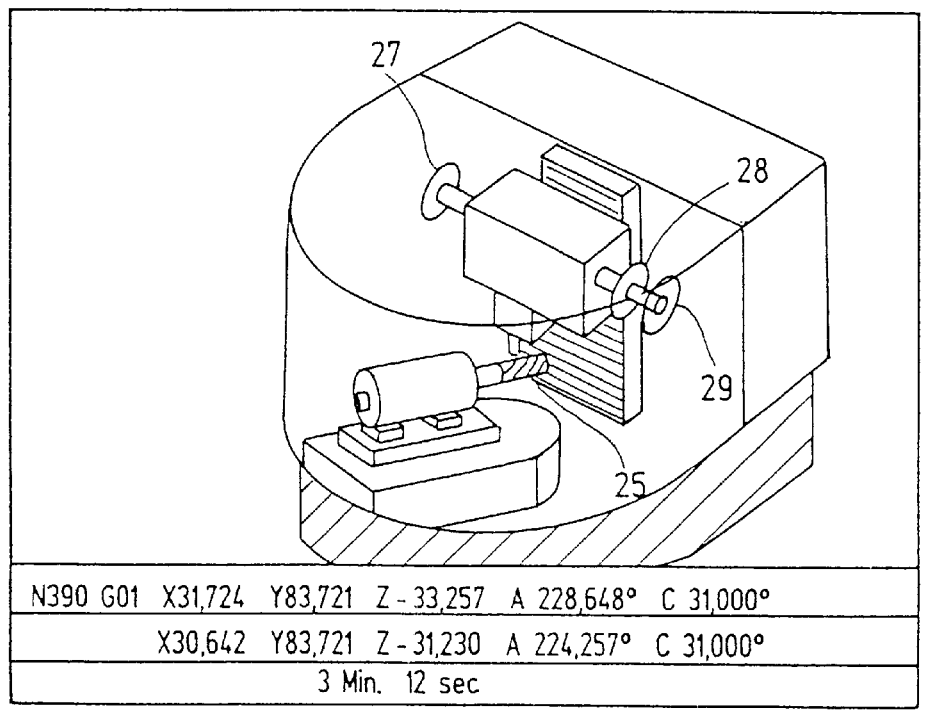
FIG. 11 is a screen display of the machine for performing the machining operations of FIGS. 7–10.
Figure 12:
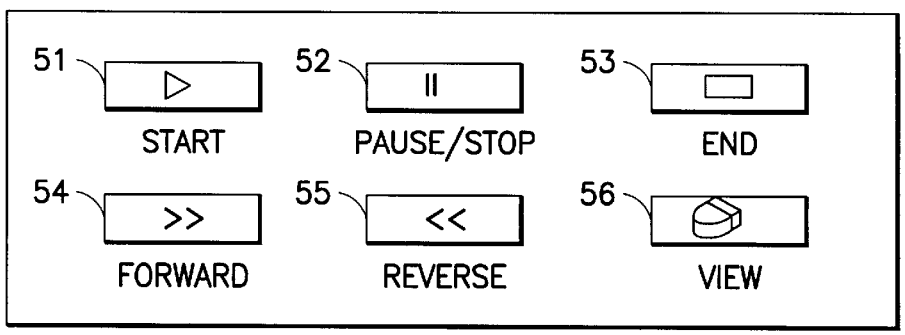
FIG. 12 shows an operator panel for the simulation module.
Figure 13:
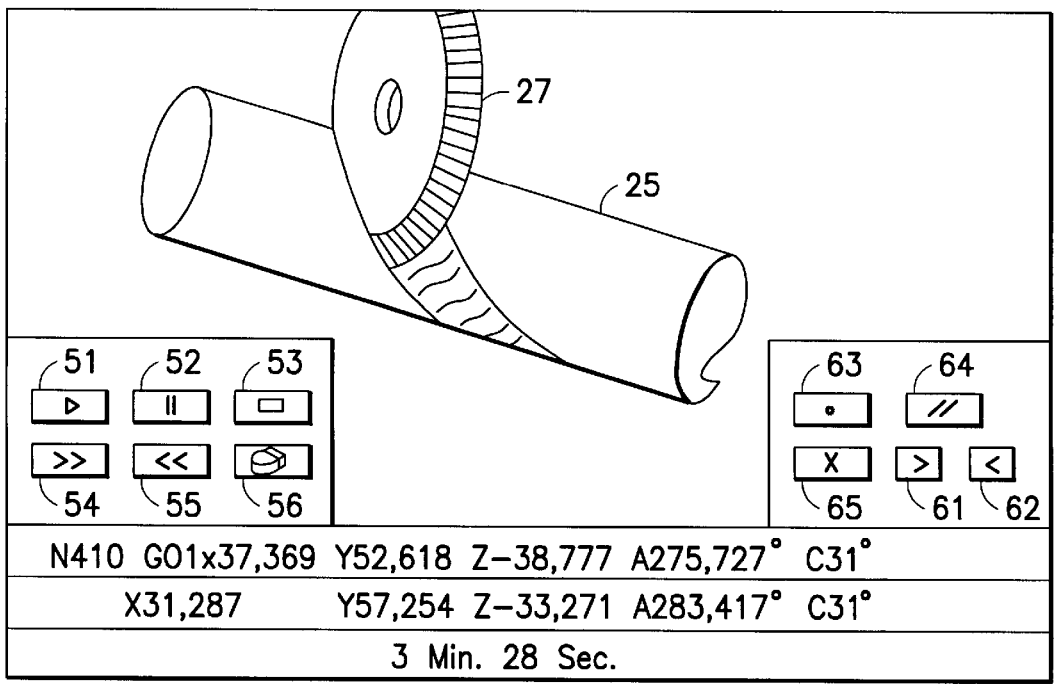
FIG. 13 is a screen display during the course of simulation.
Figure 14:
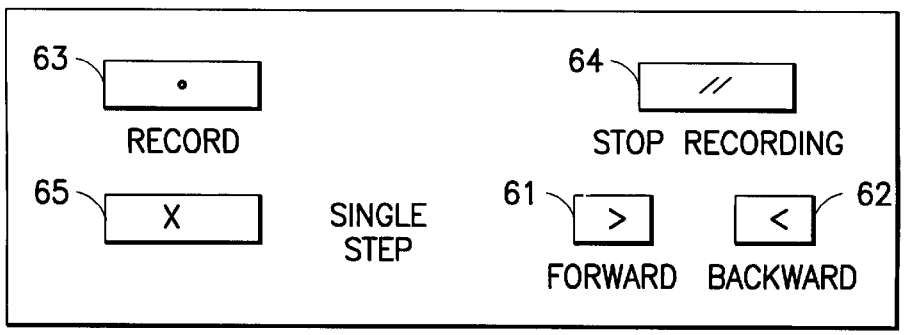
FIG. 14 shows an expanded view of a portion of the screen display of FIG. 13.

The recording of desired workpiece motions is shown in FIGS. 6–14. The point of departure is for instance an existing machine control program. This program can be displayed by means of a simulation run. The operator panel shown in FIG. 12, which is shown on a monitor, is used for this purpose. The result of the simulation can for instance be a workpiece view shown in FIG. 10. Optionally, the display can be switched over to the elevation view of the entire machine, as shown in FIG. 11. If the outcome of the machining is as desired, then the NC program can remain unchanged. If it is to be changed, however, then the simulation run can be interrupted at a desired point and a change to the virtual teach-in operating mode can be made. This is shown in FIGS. 13 and 14. The operator panel of FIG. 14, which is present in addition to the operator panel of FIG. 13, permits the recording of motion data of the grinding wheel and/or the workpiece. These data can be input by means of an input device, such as a joystick or mouse. Pressing the operator key 64 labeled "Record" translates the motions that have been input into one or more machine control program lines.

Amending existing program lines is a straightforward process when keeping in mind that the machine control program not only defines a special relative movement of the real working tool relative to the workpiece but also the same movement of the graphical representation of the working tool relative to the graphical representation of the workpiece. "Simulation" refers to the visual display of the movements of the graphical representations of working tool and workpiece. For the purposes of the invention, what is required is the opposite process, i.e. the transformation of data obtained by graphical manipulation of the path or movement of the graphical representation of working tool and workpiece into machine control program lines or sentences. What do such program lines define? They specify which movements are to be performed. If the directions, speeds, paths or any other features of this movement are changed on the monitor the program has only to introduce this data into the machine control program sentences, to add sentences or to delete sentences. This is well known to anyone having ordinary skill in the art.

During the continuous simulation run (FIG. 12), the machine control program is executed continuously, and the following actions can be actuated by the user:

a) Starting or continuing the execution of the machine control program: The execution is started, or is continued after a temporary stop, by pressing key 51.

b) Temporary stop in execution of the machine control program: The execution is interrupted but can be continued, by pressing key 52.

c) Terminating execution of the machine control program: The execution is terminated and can be begun again only by means of a restart, by pressing key 53.

d) Fast forward in machine control program execution: More than one program set is skipped, by pressing key 54. If desired, one can skip to the next machining operation.

e) Fast rewind in machine control program execution: More than one program set is rewound, by pressing key 55. If desired, one can skip back to the previous machining operation. The graphics are then reset by the applicable operations, and the workpiece is displayed the way it looked when the corresponding machine control program lines were executed. The machining time is reset as well.

f) Switchover between views with and without the machine space (e.g., as shown in FIG. 11) by pressing button 56.

The single-step processing of the machine control program can be actuated by pressing the temporary-stop key 52. As shown in FIG. 13, the grinding wheel 27 remains in its current position, and the current machine control program lines and the machining time elapsed thus far are displayed. As shown in FIG. 14, the following actions can be actuated:

a) Single step forward: The next program line is executed by pressing key 61. The graphics and machining time are updated.

b) Single step back: The processing of the program is reset by one line by pressing key 62. The graphics and machining time are updated; that is, any material erosion that may exist is rescinded, and the grinding time is reset.

c) Start/Record: The system goes into the recording mode when key 63 is pressed. Immediately, all the manually specified machine motions are recorded and stored in memory. Here again, the graphics are updated.

d) Stop/Record: The recording mode, and thus the recording of the motions specified by the user, are terminated when key 64 is pressed.

Key 65 is a delete button.

Figure 17:
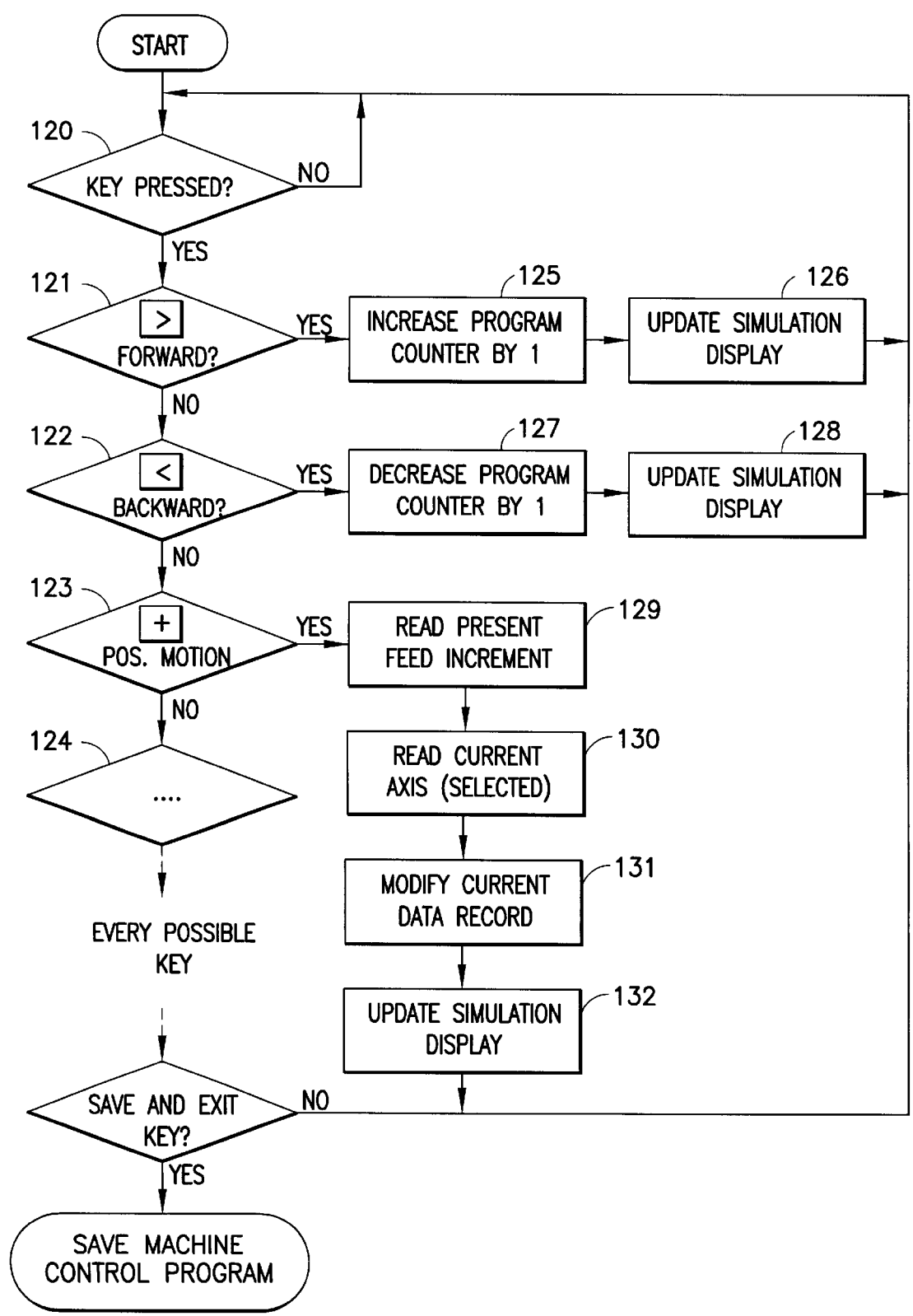
FIG. 17 is a flow chart that illustrates a graphic manipulation for modifying state data sets.

FIG. 17 is a flow chart that illustrates the graphic manipulation described above for modifying the state data sets. The list of data records obtained as illustrated by FIGS. 16A to 16C is obtained, and step 120 determines whether any of the keys depicted in FIGS. 6 and 12–14 has been pressed. If a key has been pressed, steps 121–124 identify it, and steps 125–132 perform the corresponding data modification and display update. When a save and exit key is pressed, the machine control program is saved, as illustrated in FIG. 18.

Figure 18:
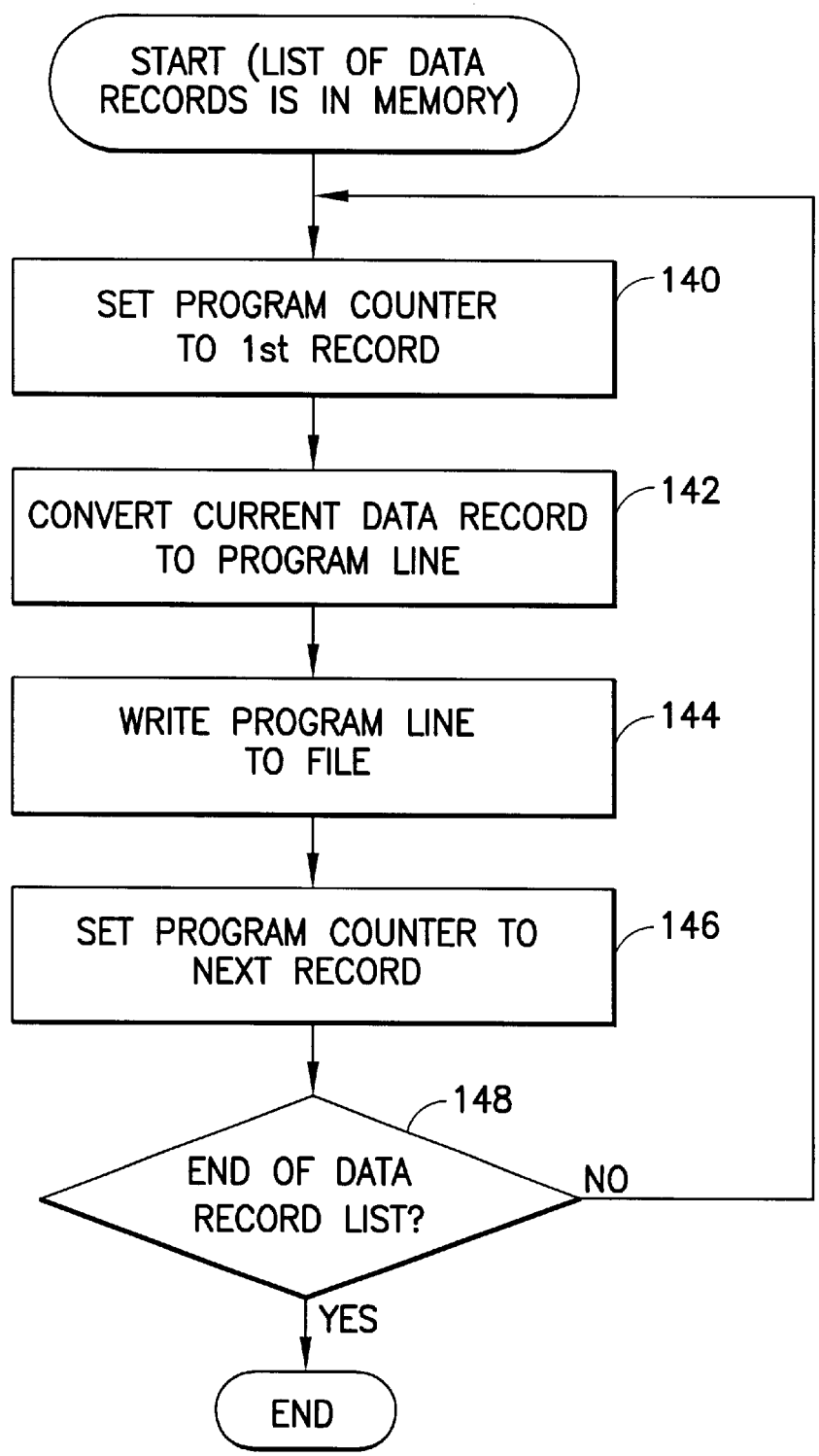
FIG. 18 is a flow chart illustrating how the modified data sets are saved.

Step 140 of FIG. 18 accesses the list of data records by initially setting the program counter to read the first record. Step 142 converts the data record to a program line, and step 144 writes that program line to file. The program counter is then set to read the next record, per step 146. Step 148 determines when the end of the data record list is reached.

The simulation module 3 and/or teach-in module 2 calculate the machining time, and they output the grinding time that has elapsed since the start of the program in the form of a status line. The grinding time is updated each time a machine control program line is executed. As in the collision observation, a distinction is made between the off-line mode and the on-line mode; that is, the machining time can be displayed directly or can be written into a file. The current program line and the actual position of the machine axes/actuators are also shown.

Figure 15:
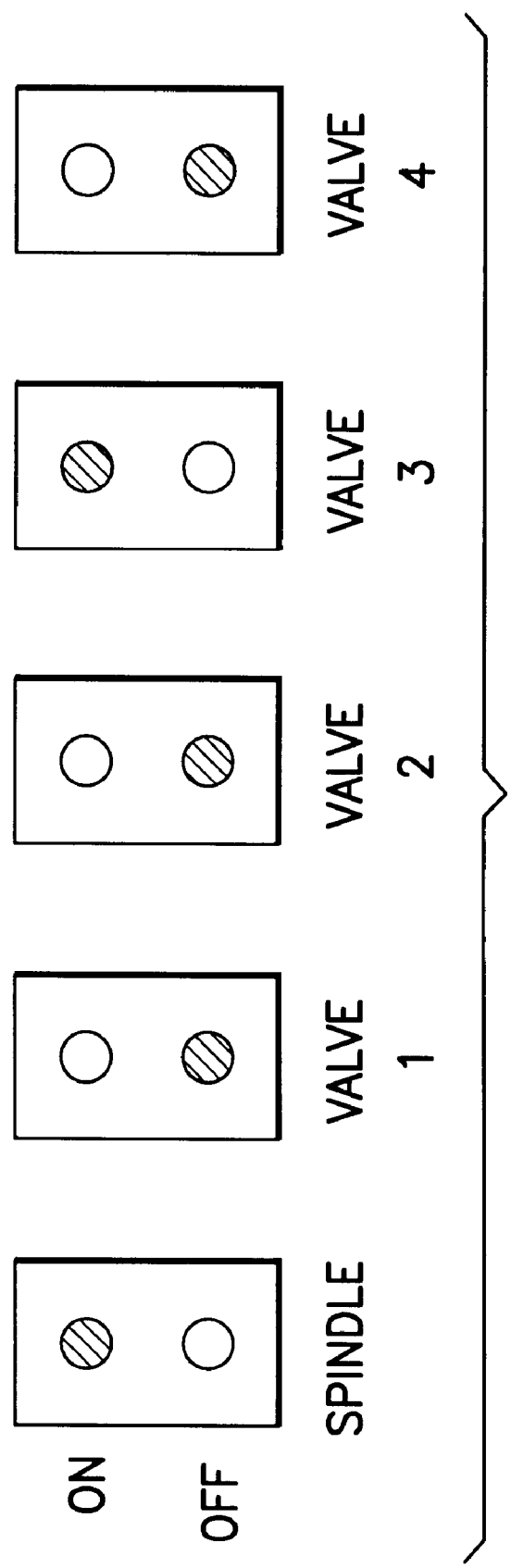
FIG. 15 shows the screen display of an SPS monitor.

As needed, machine control program lines can be input directly or indirectly by graphic manipulation. The SPS status is varied accordingly. For instance, the grinding wheel spindle or the coolant valves can be turned on and off. The status monitor of FIG. 15 shows the current status of the SPS inputs and outputs. The status of the outputs can be varied by suitable operator elements, and these changes are then transferred to the current NC program.

Both the workpiece model and the machine or wheel model can be measured at any time using the mouse. In this process, points in space are selected by clicking on an area or edge whose spacing or angle from one another is displayed on the screen. An implementation of such an operation is readily apparent to anyone with ordinary skill in the art.

A two-dimensional sectional view of the workpiece can be generated with the aid of a plane and can then be measured. The plane can be selected either arbitrarily or in terms of a peripheral condition, such as being parallel to the X axis. Thus in a section perpendicular to the longitudinal axis of the workpiece, for instance, the flute width or the effective cutting angle of the chip volume can be measured. An implementation of such an operation is readily apparent to anyone with ordinary skill in the art.

It can be expedient, if needed, to enable modeling the desired workpiece by manipulating a (swept) surface created by the motion of the grinding wheel through space. The track of the grinding wheel (swept surface) provides a volume that can be arbitrarily displaced and rotated. It is possible to restrict the displacements and rotations by means of peripheral conditions, such as displacing the volume along a coordinate axis, until this axis touches the workpiece at at least one point. Other contact surfaces, such as planes, are also possible. Next, the volume can be moved a certain distance into the workpiece by a certain amount along the surface normal, so that a defined erosion depth results. In this type of modeling, the desired machine control program is either generated entirely or completed. An implementation of such an operation is readily apparent to anyone with ordinary skill in the art.

A virtual teach-in module for programming grinding machines or other kinds of machine tools includes a graphic user surface. This surface contains the visual display of blanks, workpieces and/or working tools. The elements shown can be displaced arbitrarily relative to one another by suitable operator elements. The resultant displacements are recorded by the virtual teach-in module and translated into a machine control program, or an existing machine control program is modified on the basis of the displacements.

Various modifications to what has been described in detail above will readily occur to anyone with ordinary skill in the art. All such modifications are intended to fall within the scope of the present invention as defined by the following claims.

What is claimed is:

1. A system (1) for generating, varying and/or displaying programs for machine control, in particular for controlling grinding machines, having a teach-in module (2), which provides a visual display of a workpiece (25) and a tool (27, 28, 29) and allows manipulation of the display by moving the workpiece displayed and the tool displayed relative to one another, and which on the basis of the manipulation generates a machine control program (NC program).

2. The system of claim 1, characterized in that the teaching module has the following elements:

a storage means (17),
  which is arranged for storing workpiece data that characterize a workpiece in a machining state in memory,
  which is also arranged for storing tool data that characterize a tool in memory, and
  that is arranged for storing instructions that characterize one or more relative motions between tool and workpiece and memory;

a calculation means (16), which is arranged, on the basis of the instructions, for varying the workpiece data and/or the tool data and/or data about the position of the workpiece and tool in a way that corresponds to a machining of the workpiece (25) by the tool (27) in accordance with the relative motion; a display means (18), which is arranged to provide a visible display of the tool and workpiece and of its relative motion on the basis of the workpiece data and the tool data; and an input means (19), which is arranged for varying the relative motion to be displayed by the display means, between the tool (27) and workpiece (25) and accordingly varying the instructions that characterize the relative motions.

3. The system of claim 2, characterized in that a transformation means is provided, for converting the instructions into the machine control program (NC program).

4. The system of claim 3, characterized in that the transformation means is part of the calculation means (16).

5. The system of claim 2, characterized in that the instructions are formed by a sequence of program commands that form the machine control program.

6. The system of claim 2, characterized in that the storage means (17), calculation means (16), display means (18) and input means (19) are each one program in conjunction with the part used by it of a computer.

7. The system of claim 2, characterized in that the input means (19) has a device (15), arranged as a manual input interface, and an-operator panel as well as a program for operating the device (15) and the operator panel, and the operator panel is preferably a display with operator key panels (32) and if needed display panels (23) that is to be shown by a display device (14).

8. The system of claim 7, characterized in that machine axes (X, X', Z, C) are assigned to individual operator key panels.

9. The system of claim 7, characterized in that operator key panels (32) are provided, with which configurable axes (K) can be associated, which axes determines a motion composed of a plurality of machine actuator motions.

10. The system of claim 2, characterized in that the storage means (15) includes a library that contains data on one or more blanks as well as data that characterize one or more tools.

11. The system of claim 2, characterized in that the display means includes an SPS status monitor, which displays the current status of all the inputs and outputs of the machine control program (SPS).

12. The system of claim 2, characterized in that the storage means (17), calculation means (16), display means (18) and input means (19) are each one program section in conjunction with the part used by it of a computer.

13. The system of claim 2, characterized in that the input means (19) has a device (15), arranged as a manual input interface, and an operator panel as well as a program section for operating the device (15) and the operator panel, and the operator panel is preferably a display with operator key panels (32) and if needed display panels (23) that is to be shown by a display device (14).

14. The system of claim 1, characterized in that the machine control program is varied in the manipulation of the display.

15. The system of claim 14, characterized in that upon the variation of the machine control program, information or data about the direction, travel distance and/or speed of a motion of the workpiece and/or of the tool are varied.

16. The system of claim 1, characterized in that the system additionally contains a simulation module which provides a visual display of a machining operation, which operation corresponds to an existing machine control program and is characterized by a material erosion from the workpiece.

17. The system of claim 16, characterized in that the simulation module is part of the teach-in module.

18. The system of claim 16, characterized in that the simulation module has an operator panel (12) which is preferably a display of operator key-panels and if needed display fields that is to be shown by a display device (14).

19. The system of claim 16, characterized in that the simulation module permits the interruption, repetition, speeding up, slowing down, or intermittent display of the simulation.

20. The system of claim 16, characterized in that either the visual display is limited to the tool and the workpiece, or the machine space is included as well.

21. The system of claim 16, characterized in that the visual,display can be surveyed, and that for surveying operations, interactively usable markers are provided.

22. The system of claim 16, characterized in that the tools are grinding tools.

23. The system of claim 16, characterized in that the system is part of a grinding machine.

24. The system of claim 1, characterized in that either the visual display is limited to the tool and the workpiece, or the machine space is included as well.

25. The system of claim 1, characterized in that the visual display can be surveyed, and that for surveying operations, interactively usable markers are provided.

26. The system of claim 1, characterized in that the system includes a collision calculation module.

27. The system of claim 1, characterized in that the system includes a time calculation module (2b).

28. The system of claim 1, characterized in that the tools are grinding tools.

29. The system of claim 1, characterized in that the system is part of a grinding machine.

30. A system (1) for generating, varying and/or displaying programs for machine control, in particular for controlling grinding machines, having a teach-in module (2), which provides a visual display of a workpiece (25) and a tool (27, 28, 29) and allows manipulation of the display by moving the workpiece displayed and the tool displayed relative to one another, and which on the basis of the manipulation varies a machine control program (NC program).

* * * * *